Jan. 20, 1953    R. G. INNES ET AL    2,626,051
APPARATUS FOR SEPARATING POTATOES
Filed Nov. 3, 1948    2 SHEETS—SHEET 1
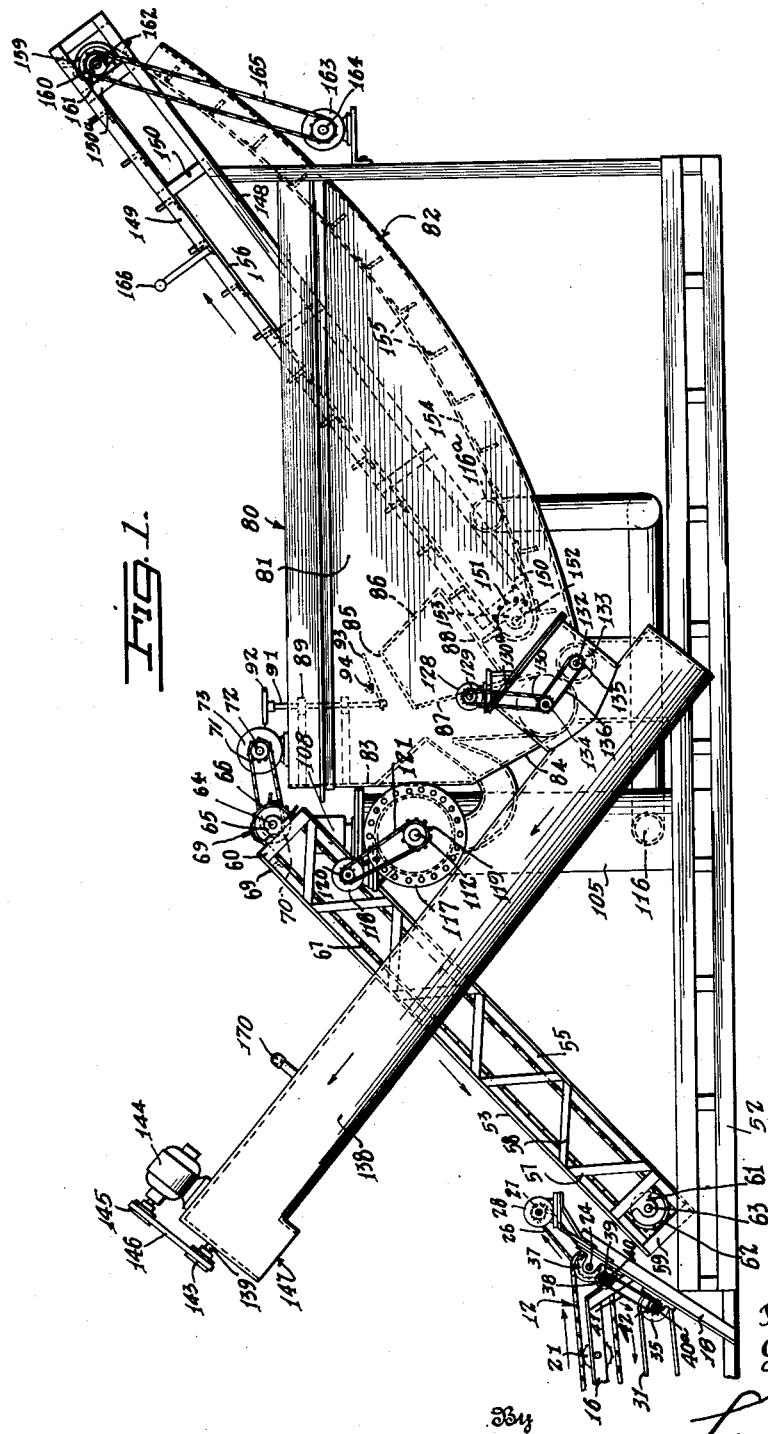
Inventors
Robert G. Innes
George Innes
By Lyon & Lyon
Attorneys Jan. 20, 1953 R. G. INNES ET AL 2,626,051
APPARATUS FOR SEPARATING POTATOES
Filed Nov. 3, 1948 2 SHEETS—SHEET 2
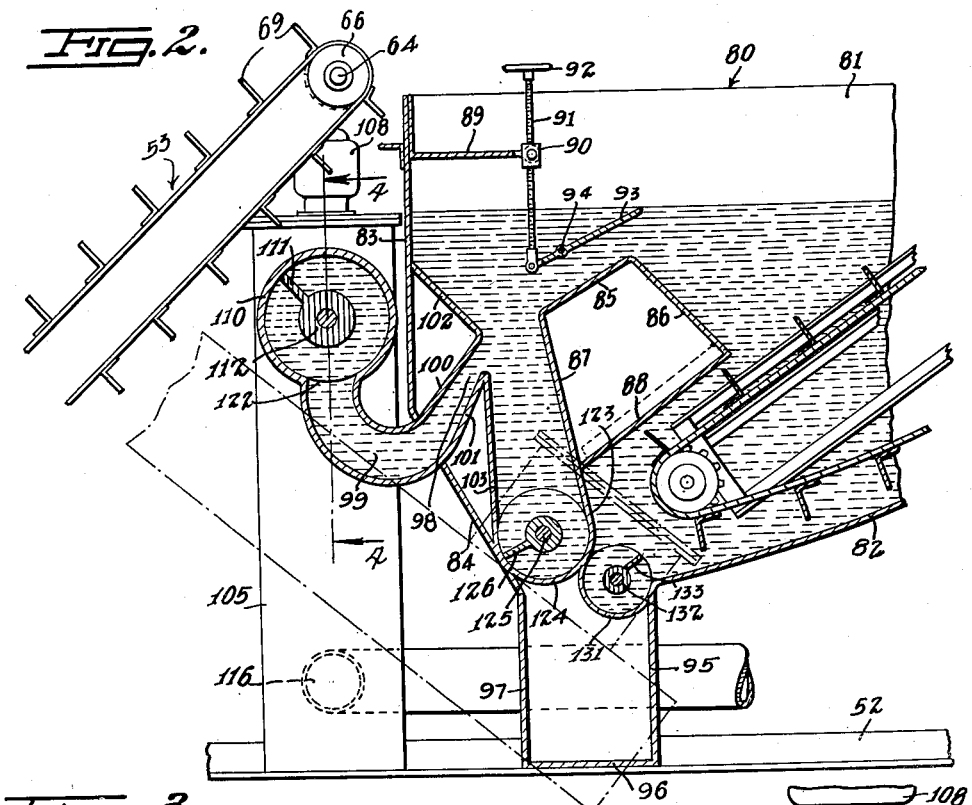
Inventors
Robert G. Innes
George Innes
By
Lyon & Lyon
Attorneys Patented Jan. 20, 1953

2,626,051

UNITED STATES PATENT OFFICE 2,626,051

APPARATUS FOR SEPARATING POTATOES

Robert G. Innes, Davenport, Iowa, and George Innes, Altadena, Calif.; said Robert G. Innes assignor to said George Innes Application November 3, 1948, Serial No. 58,106

3 Claims. (Cl. 209—157)

This invention relates to a machine for separating harvested potatoes from sand, clods, stones and the like, and is characterized principally by the fact that a rising column or head of water is utilized to permit a classification of the materials, depending upon their differences in specific gravity, by means of which potatoes are separated from the other material.

It is a feature of this invention that a tank is provided, in one portion of which there is positioned a flume to which is fed a rising column or head of water which picks up potatoes deposited in this area and causes them to traverse over a baffle. In the meantime clods and rocks which are of sufficient specific gravity not to be carried over the baffle are thus separated from the potatoes.

It is another feature of this invention that while a column of water is thus used for the separating of potatoes from the impurities, the potatoes are very quickly removed from exposure to to the water and are thus not spoiled by what in fact would amount to a drowning of the potatoes.

It is another feature of this invention that novel means are provided to equalize the pressure and the flow of water through the width of the flume.

It is another feature of this invention that a novel pump mechanism is provided adapted to handle muddy water which may contain dirt, sand, vines and other impurities.

It is another feature of this invention that novel baffling means are provided as above specified for equalizing the flow of water over the width of the flume having a large central core whose diameter is great enough to prevent the entangling thereon of vines and the like.

It is another feature of this invention that an elevator is provided for removing the separated potatoes from the tank, which elevator on its return flight acts to force sand, rocks and the like into a conveyor which removes the same from the tank.

It is another feature of this invention that the belts or conveyors for conveying the mixed potatoes, rocks, clods and the like to the separator have variable speed control means whereby the loads being deposited in the separator can be regulated at will.

Basically, the invention utilizes the principle that freshly harvested potatoes have a specific gravity of approximately 78 pounds per cubic foot, while wet sand will have a specific gravity in the neighborhood of from 113 to 118 pounds per cubic foot, and stones and rocks will vary from 120 to 150 pounds per cubic foot; thus it is possible to separate the potatoes from the wet sand, silt, stones and other impurities by presenting the accumulated mixture to a rising column of water so regulated as to carry the light potatoes over a baffle, but which column of water is insufficient to lift the wet sand and stones and other impurities. It is necessary, however, in utilizing this principle to remove very quickly the potatoes from the water, as freshly harvested potatoes are living organisms which will be drowned on long exposure to the water and quickly spoil.

These and other objects, advantages and features of the invention will be apparent from the annexed specification in which:

Figure 1 is a side view of a separator involving the present invention.

Figure 2 is an enlarged vertical, longitudinal, fragmentary section taken through the left end of the tank in Figure 1.

Figure 3 is an enlarged fragmentary longitudinal section taken through the lower end of the cylinder 138 in Figure 1.

Figure 4 is an enlarged fragmentary section taken along the lines 4—4 of Figure 2.

Referring to the drawings and particularly to Figure 1, the forward end of a conveyor belt 12 is disposed above an elevator which is mounted on a frame 52 and comprises an elevator frame including upper spaced guide bars 53, only one of which may be seen in Figure 1, lower spaced guide bars 55, only one of which may be seen in Figure 1, lateral struts 57 and 58 and end pieces 59 and 60. It will be appreciated that what has been described and particularly illustrated in Figure 1 is one side only of the elevator frame and an opposite rear side is to be understood.

Suitably mounted as upon a shaft 63, journaled in bearings 61, carried by the frame are sprockets 62, and, similarly, suitably mounted as upon shaft 64, journaled in bearings 65 are sprockets 66.

A pair of chains 67, only one of which may be seen in Figure 1, are carried by the sprockets 66 and the sprockets 62 and between the chains 67 there is secured a plurality of spaced angle bars 69 forming the carrying portions of the elevator. It will be appreciated that potatoes deposited on the elevator by the belt 12 are raised by the elevator, particularly by the angle bars 69, to an elevated position. The sprockets 66 are driven by means of a sprocket 70 keyed to the shaft 64 and a chain 71 riding over a sprocket 72 keyed to the shaft of a motor 73.

From the elevator just described the potatoes still having intermingled therewith a certain amount of stones, sand and dirt are deposited into the separator tank.

A separator tank is indicated generally by the number 80 and comprises side walls 81, a bottom wall 82 which is curved and disposed substantially in a plane at an acute angle to horizontal as indicated, having a rear wall 83 broken as at 84. Disposed within the tank 80 and running laterally between the side walls 81 are baffle plates 85, 86 and 87. The baffle plates 85, 86 and 87 are joined as shown most clearly in Figure 1 and Figure 2, and together with the bottom plate 88 form an enclosed box. A bracket 89 is attached to the rear wall 83 and has an enlarged threaded portion 90 adapted to receive a threaded shaft 91 having at one end a hand wheel 92 and having its other end pivotally connected to a plate 93 which is pivotally mounted between the side walls 81 of the tank as at 94. The plate 93 likewise extends substantially the entire distance between the side walls 81, and by turning the hand wheel 92 the plate 93 may be disposed so as to regulate the size of the passage between the plate 93 and the baffle plate 85.

Referring particularly to Figure 2, it will be noted that a well comprising a forward wall 95, a bottom wall 96 and a rear wall 97 and side walls formed by an extension of the walls 81 has been provided adjacent the rear portion of the tank. Further, it will be noted that an opening 98 is provided in the broken rear wall 84, which opening is in communication with a flume 99. The flume 99 likewise extends substantially completely across the width of the tank and has an extension formed by the walls 100 and 101 and walls 102 and 103 entrant into the tank 80. The walls 100 and 101 converge slightly, as shown, forming a restricting nozzle serving to prevent eddying of the water.

Disposed to one side of the tank 80 in an upstanding position is a pump comprising a cylinder 105 in which is rotatably mounted a ribbon screw 106 forming the impeller of the pump. The ribbon screw 106 is wound about a central shaft 107, which shaft has a substantial diameter sufficient so that any vines or the like which may be present in the water in the tank will not be able to wind completely about the shaft and clog the mechanism.

The shaft 107 is attached to the shaft of a motor 108 and driven thereby. The outlet end of the pump comprises an opening 109 in the wall of the cylinder 105 in line with which is a laterally disposed cylinder 110. The cylinder 110 is likewise provided with a ribbon screw 111 wound upon a shaft 112 which is likewise of substantial diameter for the same purpose as is the shaft 107. The shaft 112 is reduced as at 113, which reduced portion is journaled in a bearing 114 carried by the spider 115. A conduit 116 provides communication with the bottom of the cylinder 105 for circulating water to the pump from the tank 80. The cylinder 110 and the shaft 112 with its ribbon screw 111 extends beyond the margin of the walls 81 as indicated at 117 and a motor 118 is mounted upon the extension, driving the shaft 112 through sprockets 119 and 120 interconnected by the chain 121.

The cylinder 110 has an opening running substantially the full length of the cylinder 110 which lies within the limits of an extension of the walls 81, which opening is indicated at 122 and is in communication with the flume 99. It will be appreciated that water in the pump formed by the cylinder 105 is communicated to the cylinder 110 and flows outward through the opening 122 into the flume 99. The screw 111 mounted on the shaft 112 is for the purpose of equalizing the water pressure, and it is driven at a relatively low speed of the order of about twenty-two revolutions per minute with the purpose in mind to present the same water pressure throughout the entire width of the flume 99. It has been discovered that such an auger or ribbon screw will have this effect, particularly when its ends are extended beyond the limits of the flume in both directions as indicated herein.

The wall or baffle plate 87 has a continuation 123 which likewise extends completely across the tank between the walls 81 and a portion of this wall 123 is rounded as at 124 to form a half-cylinder and communicates with the wall 103 as clearly indicated in Figure 6. A shaft 125 having a ribbon screw or auger 126 wound thereon is positioned in the semi-cylindrical portion 124, and this semi-cylindrical portion communicates with a box 127 extending outwardly from the sides of the tank, and the shaft and auger extend into said box and are driven by a motor 128 mounted on the box through the sprockets 129 and 130 and chain 130a.

The bottom wall 82 has a substantially semi-cylindrical portion 131 similarly extending completely between the walls 81, and this semi-cylindrical portion communicates with and closes with the portion 124 as shown in Figure 6. Disposed within this semi-cylindrical portion 131 is a shaft 132 having a ribbon screw or auger 133 wound thereon. The semi-cylindrical portion 131 similarly communicates with the box 127 and the shaft 132 and screw 133 are driven likewise by the motor 128 by means of the sprockets 134, 135 and chain 136. The box 127 has an opening 137 therein communicating with a cylinder 138. The cylinder 138 is disposed both at an angle to the horizontal and at an angle to the axis of the separator as shown by comparing Figures 1, 2 and 3, and the cylinder 138 has a shaft 139 therein on which is wound a ribbon screw or auger 140. The shaft 139 is journalled in a bearing 141 on the end wall 142 of the cylinder 138, and the upper end of the shaft 139 extends through the upper end wall of the cylinder and is fitted with a pulley 143. A motor 144 is mounted upon the cylinder 138 and the shaft thereof is provided with a pulley 145 connected to the pulley 143 by a belt 146. Thus the shaft 139 and ribbon screw 140 is driven by the motor 144. The upper end of the cylinder 138 is provided with a discharge opening 147 for purposes hereinafter described.

While there has been disclosed means for disposing of the rocks, sand, gravel and similar material screened from the potatoes in the tank 80 comprising the augers 126, the augers 133 and the auger 140, it is also contemplated that in place thereof the invention may utilize belt conveyers, which belt conveyers will serve in the well known manner to remove the same materials to the same stations for the same purposes. In this regard it is contemplated that the belt conveyer which replaces the auger 140 will be provided with a plurality of flights spaced and fastened to the belts for the purpose of giving traction to the loose sand, rocks, etc.

Mounted within the tank 80 and having its upper end extending outwardly beyond said tank is an elevator. The elevator comprises frame members 148 and 149 and interconnecting members 150 and sprockets 151 are mounted on a shaft 152 which is journalled in bearings 153 carried by the bottom interconnecting member 150. Chains 154 are provided running over the sprockets 151 and attached to the chains 154 are angle bars 155. A grill, not shown, supported by the frame members 149, comprises the support for the upper flight of the chains 155. At the upper end of the frame sprockets 159 are provided mounted on a shaft 160 journalled in bearings 161 carried by the interconnecting member 150a. The shaft 159 carries a second sprocket 162, and a motor 163 is provided having a sprocket 164 on which is mounted a chain 165 which also connects with the sprocket 162 to drive the sprockets 159 and hence the elevator chain.

The water conduit 116 is joined to the tank 80 so as to provide for recirculation of the water. The conduit 116 should communicate with the forward and cleaner end of the tank 80, as shown at 116a. A water outlet 170 is provided on the cylinder 138. Positioned above the path of the elevator last described is a perforated pipe 166 attached to a suitable source of water for supplying a spray of water over the potatoes being removed from the tank by the elevator for the purpose of washing off muddy water and adding fresh water to the tank.

The operation of the device is as follows: Assuming that a load of potatoes mixed with rocks, clods, sand, earth, vines and the like to have been dumped upon the screen belt 12, the mixture will be conveyed along the belt 12 with some separation of rocks, earth, sand and the like which passes through the screen belt 12 and falls upon a belt 31 which, it will be noted, is being driven in the opposite direction. The belt 31 will convey the screened out material to a disposal conveyor by means of which the screened out material is removed and dumped at any suitable point.

The material remaining upon the belt 12 which will comprise substantially all of the potatoes still mixed with some clods, dirt, stones and the like which have not been separated by the screen belt is presented to the elevator comprising the chains 67 and angle bars 69. From this elevator the mixture is dumped into the tank 80 in the region of the opening between the walls 87 and 102 and thus in the path of the head of water flowing in the flume 99. The level of water in the tank 80 is maintained as shown at 180 above the uppermost portion of the baffle plate 85 with a constant head of water flowing thereover. The level 180 is maintained approximately four inches above the uppermost point of the baffle plate 85, and we have found that a rate of flow over this point of thirty-two gallons of water per inch of baffle per minute is sufficient to accomplish the functions of this invention. The mixture of potatoes, rocks, clods and the like having thus been presented to the head of water, the potatoes by reason of their lower specific gravity will be carried by the head of water over the plate 85, down the plate 86 and onto the discharge elevator. The open framework or grill upon which the chains and crossbars of this elevator in their upper flight are supported will permit any remaining sand or dirt or small stones to be dropped through the elevator onto the curved bottom 82 of the tank. This curved bottom 82 is of a configuration so that the lower flight of the chains 154 will be spaced therefrom a sufficient distance to drag the lower edges of the angle bars 155 along the upper surface thereof and scrape any sand or mud along the bottom 82 into the semi-cylindrical portion 131. Such sand and gravel thus presented to the semi-cylindrical portion 131 will be removed therefrom by the sand auger 133 and presented to the box 127.

The stones, clods, and other removed material which by reason of their higher specific gravity were unable to pass the uppermost portion of the baffle plate 85 will fall into the semi-cylindrical portion 124 and be removed therefrom by the auger 126 and presented to the box 127. The sand and lighter impurities removed by the auger 133 and the heavier impurities removed by the auger 126 and passed to the box 127 will fall through the opening 137 into the cylinder 138 and will be removed therefrom by the auger 140, discharging through the discharge opening 147 preferably to a waiting truck for disposal.

The potatoes being discharged from the discharge elevator are finally washed clean by the spray pipe 166 and can be collected from the top of the elevator in condition for sacking.

By manipulation of the hand wheel 92 the plate 93 may be adjusted so as to adjust the opening between the plate 93 and the plate 85 in order to regulate the operation of the separator. The motors 28 and 73 driving the screen belt 12 and elevator chains 67 and 68 are provided with variable speed mechanisms (not shown) which preferably comprise a right angle drive plate mechanism as is well understood in the art. By means of these variable speed mechanisms the speed of the conveyor belts and elevator may be regulated so as to regulate the rate of passage of the potatoes supplied to the separator. Further, by reason of the hereinabove described extension of the cylinder 110 beyond the limits of the tank 80 on both sides and hence beyond the limits of the flume 99, and by reason of the slowly driven auger 111 therein we are able to present a uniform water pressure and rate of flow across the full width of the flume 99, thus maintaining maximum efficiency of the separator.

It will be further noted that each of the augers which is provided herein for driving water, mud, sand, clods or the like is provided with a substantially enlarged shaft for the purpose of preventing the entanglement thereon of vines, weeds or the like.

While there has been described what is at present considered a preferred embodiment of the present invention, it will be understood by those skilled in the art that various changes and modifications can be made therein without departing from the essence of the invention, and it is intended to cover herein all such changes and modifications as come within the true spirit and scope of the appended claims.

We claim:

1. Apparatus for separating potatoes from clods, rocks, dirt and the like, comprising: a tank; a baffle dividing said tank into sections; a pump for establishing a rising flow of water over said baffle whereby said potatoes are separated from said clods, rocks and dirt by flotation over said baffle; a conduit between said pump and the first of said sections having an opening along one of its sides communicating with the first of said sections; a pressure equalizing member concentrically mounted within said conduit and extending beyond the ends of said opening whereby said rising flow of water is made uniform over the entire length of said opening; and means for removing said potatoes from said tank immediately after said separation.

2. Apparatus for separating potatoes from clods, rocks, dirt and the like, comprising: a tank; a baffle dividing said tank into sections; a pump for establishing a rising flow of water over said baffle whereby said potatoes are separated from said clods, rocks and dirt by flotation over said baffle; a conduit between said pump and the first of said sections having an opening along one of its sides communicating with the first of said sections; a pressure equalizing device in said conduit comprising a ribbon screw in said conduit; means for slowly driving said ribbon screw whereby said rising flow of water is made uniform over the entire length of said opening; and means for removing said potatoes from said tank immediately after said separation.

3. Apparatus for separating potatoes from clods, rocks, dirt and the like, comprising: a tank; a baffle dividing said tank into sections; a pump for establishing a rising flow of water over said baffle whereby said potatoes are separated from said clods, rocks and dirt by flotation over said baffle; a conduit between said pump and the first of said sections having an opening along one of its sides communicating with the first of said sections; a pressure equalizing device in said conduit comprising a ribbon screw in said conduit; means for slowly driving said ribbon screw whereby said rising flow of water is made uniform over the entire length of said opening; said ribbon screw extending within said conduit beyond said opening on both sides thereof; and means for removing said potatoes from said tank immediately after said separation.

ROBERT G. INNES.
GEORGE INNES.

REFERENCES CITED

The following references are of record in the file of this patent:

UNITED STATES PATENTS

| Number | Name | Date |
|---|---|---|
| 206,115 | Jebb | July 16, 1878 |
| 821,811 | Maguin | May 29, 1906 |
| 1,643,596 | Zuckerman | Sept. 27, 1927 |
| 1,828,760 | Blatch | Oct. 27, 1931 |
| 2,155,319 | Livingston | Apr. 18, 1939 |
| 2,240,442 | Paul | Apr. 29, 1941 |
| 2,246,532 | Prins | June 24, 1941 |
| 2,250,365 | Flynn | July 22, 1941 |
| 2,262,465 | Olney | Nov. 11, 1941 |
| 2,389,611 | Clark | Nov. 27, 1945 |
| 2,426,398 | Lathrop | Aug. 26, 1947 |